United States Patent [19]
Ogino

[11] Patent Number: 5,295,231
[45] Date of Patent: * Mar. 15, 1994

[54] OPERATIONS CONTROL APPARATUS

[75] Inventor: Toru Ogino, Kanagawa, Japan

[73] Assignee: Mitsubishi Denki Kabushiki Kaisha, Tokyo, Japan

[*] Notice: The portion of the term of this patent subsequent to Apr. 28, 2009 has been disclaimed.

[21] Appl. No.: 658,220

[22] Filed: Feb. 20, 1991

[30] Foreign Application Priority Data

Feb. 22, 1990 [JP] Japan .................................. 2-41472

[51] Int. Cl.[5] .............................................. G06F 11/00
[52] U.S. Cl. ........................................ 395/77; 395/913
[58] Field of Search ...................... 395/650, 913, 77

[56] References Cited

U.S. PATENT DOCUMENTS

4,757,442 7/1988 Sakata .................................. 395/650
5,109,380 4/1992 Ogino .................................. 395/913

Primary Examiner—Michael R. Fleming
Assistant Examiner—Tariq Hafiz
Attorney, Agent, or Firm—Wolf, Greenfield & Sacks

[57] ABSTRACT

An operations control apparatus is disclosed which includes a unit for processing data for operations control of an object, which has an event controller element, a common data base element and a simulator element; a operations control data diagnosis unit; a management element for checking the processing of the respective elements in response to the state of the object, to prepare the optimum processing order of the respective elements and for instructing the same to the event controller elements; a failure mode and effect analysis sheet preparing and correcting element; and a diagnosis rules preparing and correcting element.

5 Claims, 10 Drawing Sheets

91 — RULE 1

(ASSMP'N PART): ① IF THE TEMPERATURE OF THE TANK IS ≤ 15°C, OR
90A ② IF THE TEMPERATURE OF THE TANK IS ≥ 30°C.

(CONCL'N PART): THEN, THE RESULT OF MONITORING SHOWS THAT THE
90B TEMPERATURE OF THE TANK IS OUT OF ORDER

92 — RULE 2

(ASSMP'N PART): ① IF THE ANGLE OF THE SUN IS ≥ 30°, OR
② IF THE ANGLE OF THE SUN IS ≤ 30°.

(CONCL'N PART): THEN, THE RESULT OF MONITORING SHOWS THAT THE ANGLE OF THE SUN IS OUT OF ORDER.

93 — RULE 3

(ASSMP'N PART): ① IF THERE IS NO CHANGE IN THE ANGLE OF THE SUN IN THE ATTITUDE MANOEUVRE STAGE 1, AND
② IF THERE IS NO CHANGE IN THE TEMPERATURE IN THE CHAMBER OF THE ATTITUDE MANOEUVRE STAGE 1, AND
③ IF THERE IS CHANGE IN THE PRESSURE IN THE TANK OF THE ATTITUDE MANOEUVRE STAGE 1.

(CONCL'N PART): THEN, THE TROUBLE OF THE ATTITUDE MANOEUVRE STAGE 1 MAY POSSIBLY DUE TO THE TROUBLE OF A THERMISTOR OR A THRUSTER.

94 — RULE 4

(ASSMP'N PART): ① IF THERE IS NO CHANGE IN THE ANGLE OF THE SUN IN THE ATTITUDE MANOEUVRE STAGE 1, AND
② IF THERE IS NO CHANGE IN THE TEMPERATURE IN THE TANK OF THE ATTITUDE MANOEUVRE STAGE 1, AND
③ IF THERE IS NO CHANGE IN THE PRESSURE IN THE TANK OF THE ATTITUDE MANOEUVRE TANK 1.

(CONCL'N PART): THEN, THE TROUBLE OF THE ATTITUDE MANOEUVRE STAGE 1 IS DUE TO FAILURE OF A THRUSTER.

95 — RULE 5

(ASSMP'N PART): ① IF THERE IS PROBLEM IN THE ATTITUDE MANOEUVRE STAGE 1, AND
② IF THERE IS NO NEED TO CHANGE DELAY COUNT OF THE ATTITUDE MANOEUVRE STAGE 1.

(CONCL'N PART): THEN, DIAGNOSIS OF THE ATTITUDE MANOEUVRE STAGE 1 IS NORMAL AND OVER

A: DEGREE OF INFLUENCE
B: PROBABILITY OF OCCURRENCE
C: DEGREE OF SIGNIFICANCE

| C21 | C22 | C23 | | C24 | C25 | C26 | C27 | C28 | C29 | C30 |
|---|---|---|---|---|---|---|---|---|---|---|
| ITEM CODE | PART NAME/ TYPE | FUNCTION | % | FAILURE MODE | CAUSE OF FAILURE MODE | EFFECT OF FAILURE MODE | A | B | C | COUNTERMEASURE ADVICE |

Fig. 9

A : DEGREE OF INFLUENCE
B : PROBABILITY OF OCCURRENCE
C : DEGREE OF SIGNIFICANCE

| ITEM CODE C41 | PART NAME/ TYPE C42 | FUNCTION C43 | C44 | FAILURE MODE | CAUSE OF FAILURE MODE C45 | EFFECT OF FAILURE MODE C46 | A C47 | B | C C48 | COUNTERMEASURE ADVICE C49 | C50 |
|---|---|---|---|---|---|---|---|---|---|---|---|
| TH1 ~ TH2 | RADIAL THRUSTER | GENERATE A THRUST REQUIRED FOR CHANGING THE ORBIT | R1 | UNABLE TO PRODUCE THRUST | ·CATALYST DETERIORATED ·CLOGGING OF INLET TUBE ·DEFORMED POPPET | NO (REDUNDANT CONSTRUCTION) | 1 | 4 | 4 | NO | |
| | | | R2 | THRUST PERFORMANCE REDUCED | ·WRONG DESIGN ·DO.- HEAT | -DO.- | 1 | 4 | 4 | NO | |
| | | | R3 | LEAK OUT (LIQUID OR GAS) | ·IMPROPER SEAL ·DUST | UNABLE TO CONTROL ATTITUDE & ORBIT | 4 | 2 | 8 | ·DUPLEX SEAL STRUCTURE ·LEAK TEST BEFORE/ AFTER ENVIRON'T TEST | |
| TH3 ~ TH4 | AXIAL THRUSTER | GENERATE A THRUST REQUIRED FOR CHANGING ATTITUDE & ANGLE OF ORBIT INCLINATION | A1 | UNABLE TO PRODUCE THRUST | ·CATALYST DETERIORATED ·CLOGGING OF INLET TUBE ·DEFORMED POPPET | NO (REDUNDANT CONSTRUCTION) | 1 | 4 | 4 | NO | |
| | | | A2 | THRUST PERFORMANCE REDUCED | -DO.- ·WRONG HEAT DESIGN | -DO.- | 1 | 4 | 4 | NO | |
| | | | A3 | LEAK OUT | ·IMPROPER SEAL ·DUST | UNABLE TO CONTROL ATTITUDE & ORBIT | 4 | 1 | 4 | ·DUPLEX SEAL STRUCTURE ·LEAK TEST BEFORE/ AFTER ENVIRON'T TEST | |
| FL1 | FILTER | PREVENT ENTRNACE OF FORBIGN MATTER TO DOWNSTREAM (THRUSTER) | F1 | LOSS OF PRESSURE | ·DUST, CLOGGING | SHORT SERVICE LIFE | 3 | 1 | 3 | NO | |
| | | | F2 | BREAKAGE OF ELEMENT | ·EXCESSIVE PRESSURE SHOCK LOAD | NO (PROPELLANT VALVE FILTER INSERTED) | 1 | 1 | 1 | NO | |
| | | | F3 | LEAK OUT | ·IMPROPER SEAL | UNABLE TO CONTROL ATTITUDE & ORBIT | 4 | 1 | 4 | ·LEAK TEST BEFORE/ AFTER ENVIRON'T TEST | |

OPERATIONS CONTROL APPARATUS

BACKGROUND OF THE INVENTION

1. Field of the Invention

The present invention relates to an apparatus for controlling operations of an object such as an artificial satellite in orbit after launching.

2. Prior Art

Figure 1:
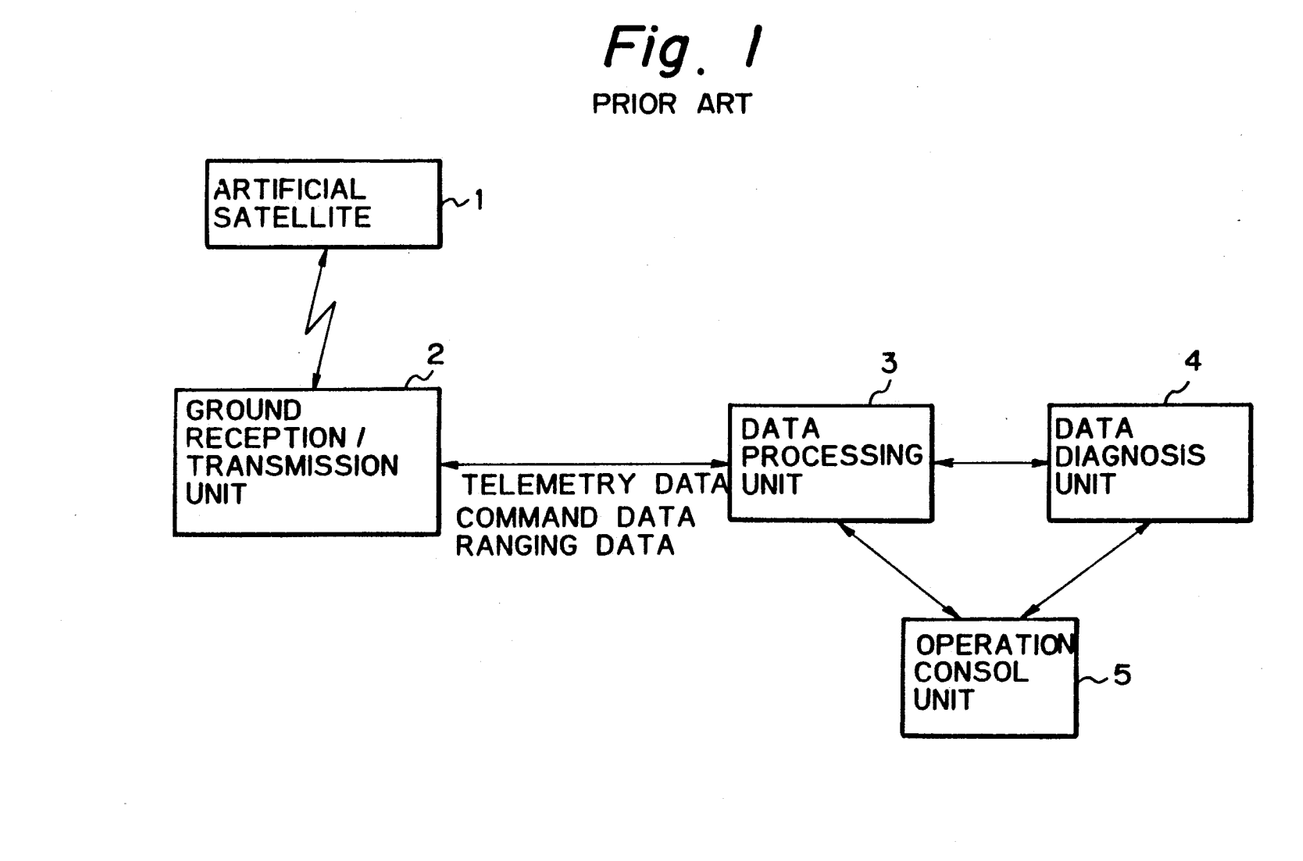
FIG. 1 is an overall diagram of the operations control apparatus according to a prior art.

FIG. 1 illustrates an operations control apparatus according to a prior art as disclosed in the Japanese Patent Laid-Open No. 62-70939. The operations control apparatus as shown in the drawing consists, in general, of a ground reception/transmission unit 2 adapted to execute transmission and reception processing of the telemetry data to be received from an artificial satellite 1 and the command data, etc. to be transmitted to the artificial satellite, a data processing unit 3 adapted to process these data, a data diagnosis unit 4 adapted to diagnose these data and an operations console unit 5 which is equivalent to an input/output unit comprising a cathode ray tube and a key board, these components being in general use, is employed for use in displaying a graphic diagram on a screen of a cathode ray tube or inputting a command by an operator from the key board, and serves as the interface between an operator and these units described above.

Figure 2:
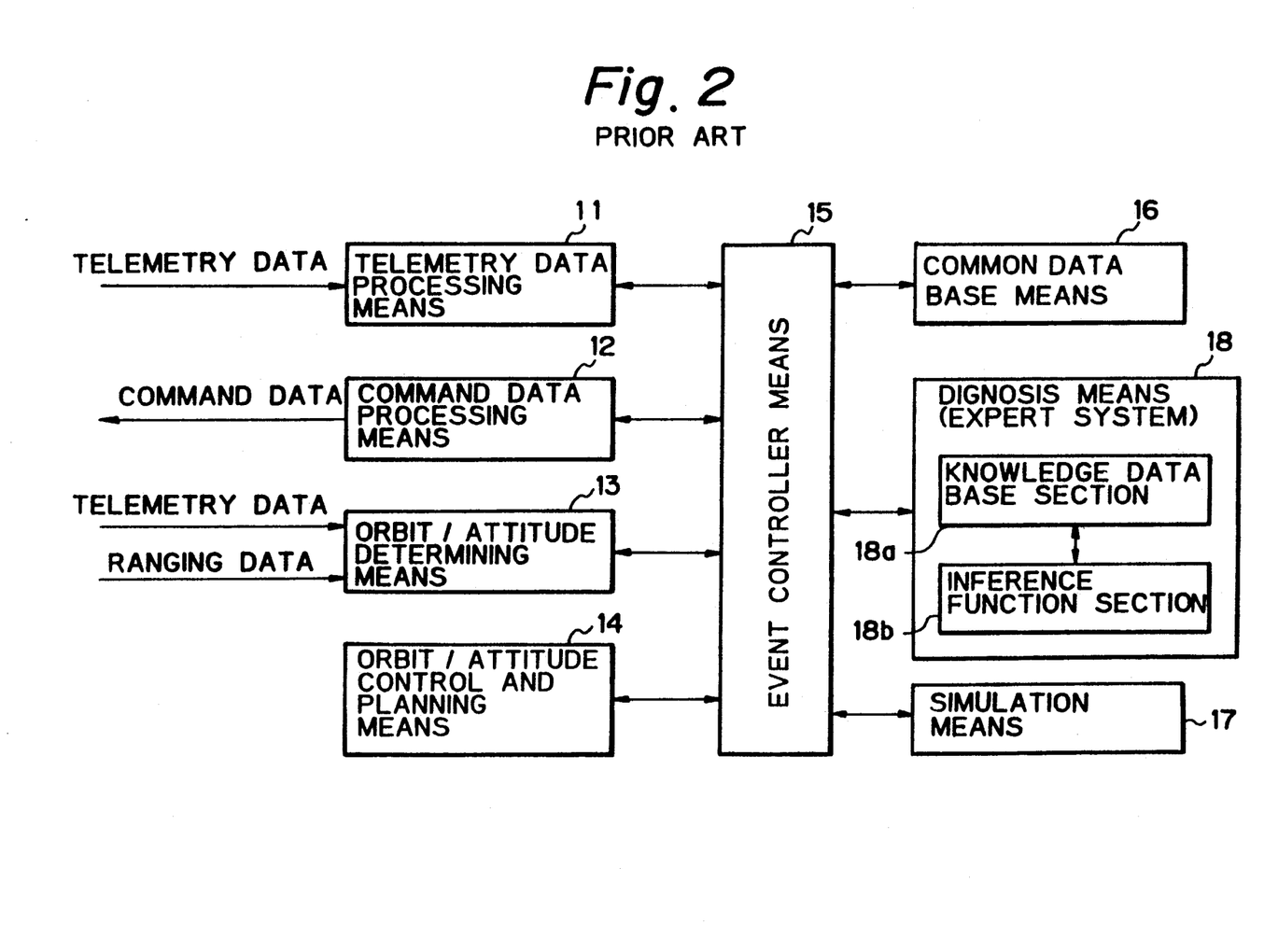
FIG. 2 is a diagram illustrating of a construction of software according to a prior art.

The above-described data processing unit 3 incorporates in constitution of the software (algorithm) shown in FIG. 2 the respective means for the software comprising a telemetry data processing means 11, a command data processing means 12, an orbit/attitude determining means 13, an orbit/attitude control and planning means 14, an event controller means 15, a common data base means 16, and a simulation means 17. In the data diagnosis unit 4 mentioned above, there is incorporated software for a diagnosis means 18 normally referred to as "an expect system" which comprises software for data diagnosis, comprising the knowledge data base section 18a and the inference function section 18b.

Operation of the operations control apparatus as described above will next be explained. According to the operations control apparatus for an artificial satellite which is constituted as above described, the telemetry data and the ranging data from the artificial satellite are input by way of the ground reception/transmission unit 2 to the data processing unit 3, where the respective processing will be carried out by the means 11-14 shown in FIG. 2.

In FIG. 2, the event controller means 15 is assumed to determine the order of activation of the means 11 through 18 and the means 11-14 will be activated in accordance with a predetermined processing order unless an external interruption is caused.

Figure 3:
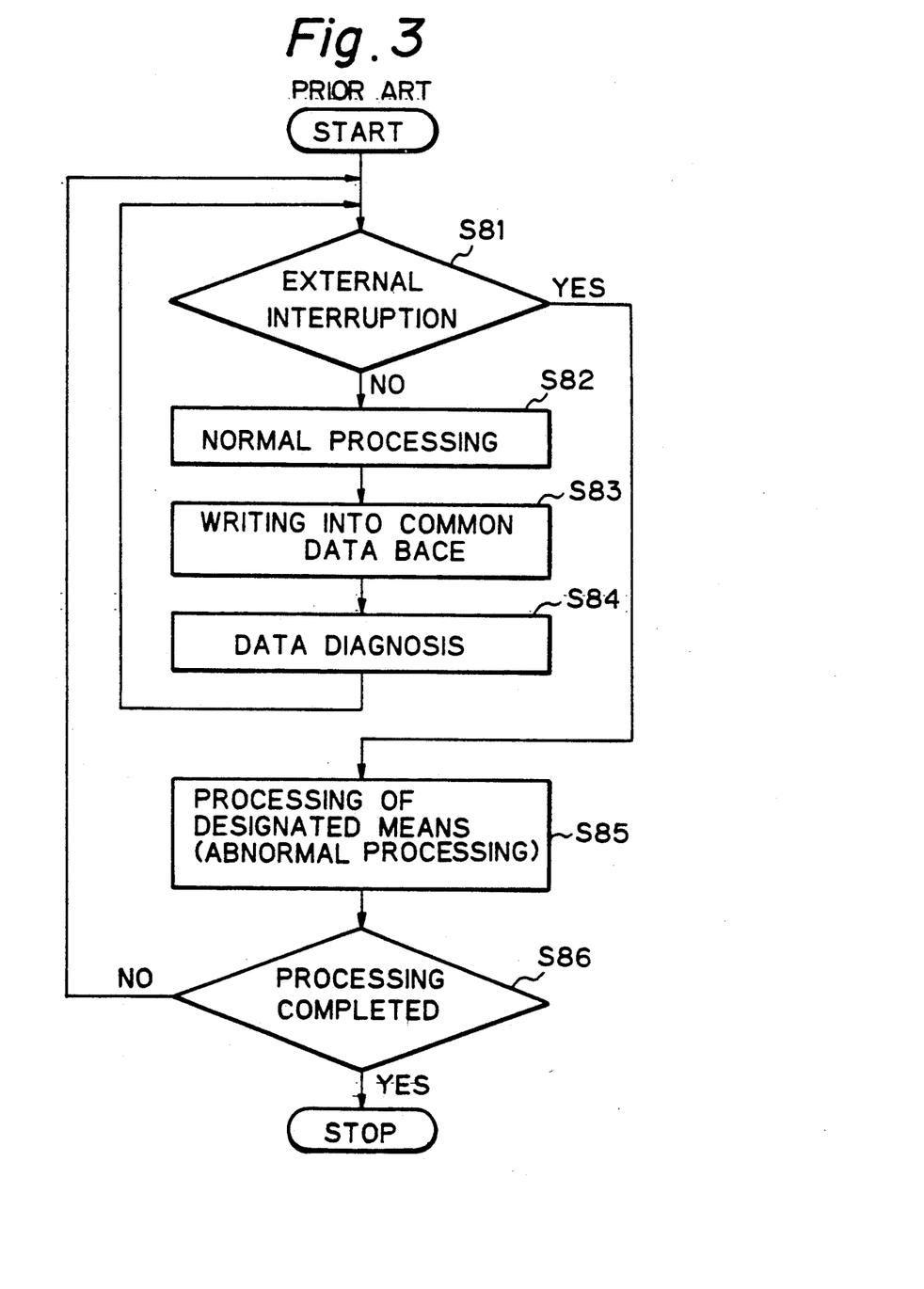
FIG. 3 is a flow chart explaining operation of the event controller means according to a prior art.

The manner of operation of the event controller means 15 will next be explained by referring to FIG. 3. In FIG. 3, S81 designates the external interruption step where a decision is made as to whether the event controller means 15 has been externally interrupted by an operator by using, for example, the operation console unit 5 including an input device such as a key board or the like so as to stop the processing. If there has been no such interruption, the process proceeds to the normal processing step S82 so that the respective means 11-14 will be activated in a predetermined processing order. Then the process proceeds to the step S83 where the common data base 16 will be activated to write the result of the processing therein. Then the process proceeds to the step S84 where the diagnosis means 18 will be activated and the data of the processing results will be diagnosed. After that, the process returns to the step S81.

In the mean time if it is found in the step S81 that the event controller means 15 has been externally interrupted, the process proceeds to the step S85 where the designated means will be caused to be activated and executed in accordance with the external request made by an operator and a decision is made in the step S86 whether the predetermined processing has been entirely completed or not. If confirmation of completion of the entire processing operation is not given, the process is still incomplete and proceeds back to the step S81.

As explained above, by means of the event controller means 15, the respective processing is automatically executed under normal conditions, while the processing can be executed as instructed by an operator owing to the external interruption even if any abnormal condition is caused.

The manner of operation in the case of the data diagnosis by using the simulation means 17 and the diagnosis means 18 will next be explained.

The simulation means 17 provides a simulation program which may simulate in advance the movement of an artificial satellite and is used as a so-called computer simulation by which the movement of an artificial satellite when the orbit control and the attitude control will be executed will be assumed and computed by the simulation means 17 before the orbit and attitude control of the artificial satellite will be actually executed.

The diagnosis means 18 provides software (or a program) which is normally called "expert system" in the field of knowledge engineering and artificial intelligence, and comprises a knowledge data base section 18a and inference function section 18b. It is activated in the data diagnosis unit 4 as described above and executes the data diagnosis processing.

The above-mentioned knowledge data base section 18a constitutes a data base comprising an aggregate of the rules for the decision criteria of the data diagnosis. An example of the diagnosis rule for the data for operations control will be explained by referring to FIG. 4. In FIG. 4, the respective rules 91-95 each consist of an assumption part 90A and a conclusion part 90B, wherein the assumption part 90A corresponds to a subordinate clause such as "if . . . ", and the conclusion part 90B corresponds to a clause such as "then . . . ". For example, what is meant by rule 1 (91) is "If the temperature of the fuel tank for the artificial satellite is out of the range from 15° C. to 30° C., the temperature of the fuel tank is abnormal". The aggregate of such rules comprises the knowledge data base 18a.

The above-mentioned inference function section 18b is constructed with a general algorithm which is generally called the "inference engine" or the like in the field of knowledge engineering and artificial intelligence. More specifically, it is provided in the form of software that, for example, allows an inference to be made from a result by way of a so-called syllogism or the like, and is operable when making an inference with the results of diagnosis from the aggregate of the "if . . . , then . . . " rules.

Figure 5:
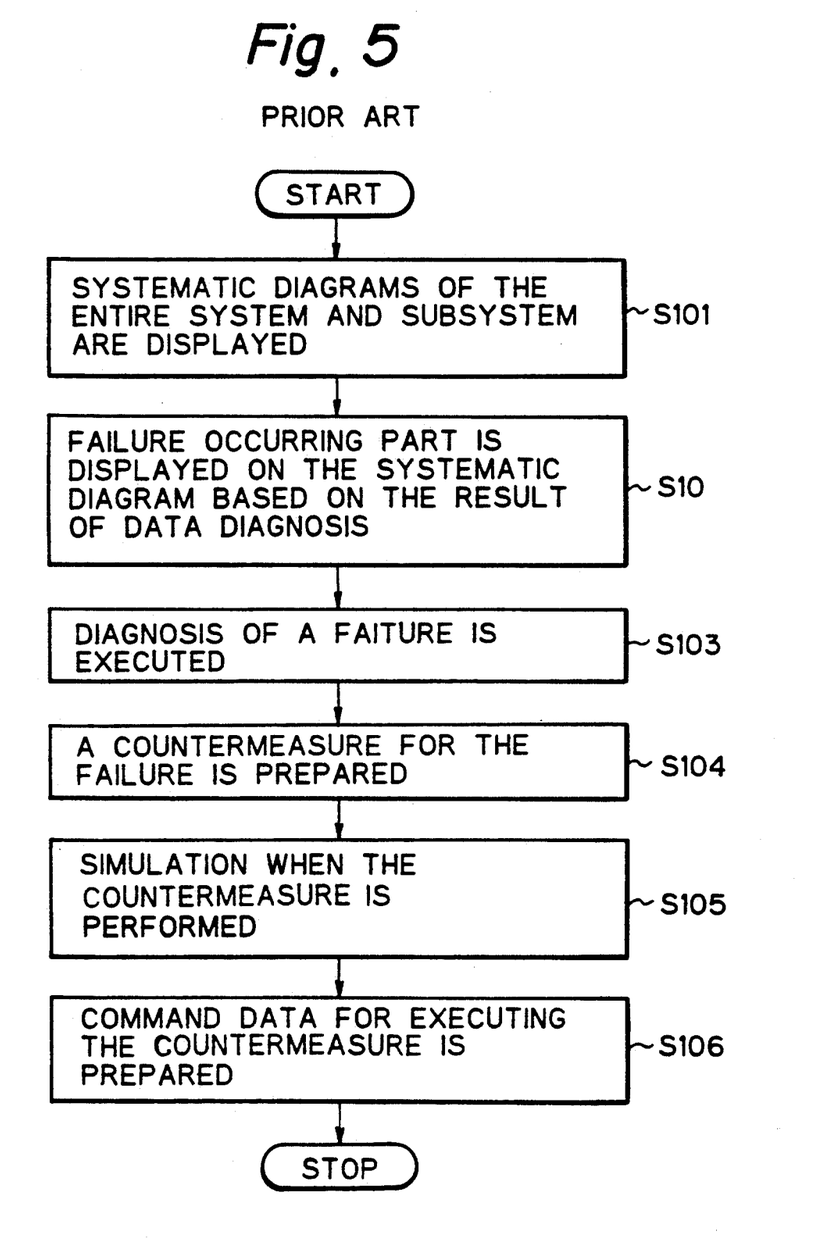
FIG. 5 is a flow chart explaining operation of the diagnosis means according to a prior art.

Operation for diagnosing the operations control data for an artificial satellite by using the respective means 15-18 as explained above will now be explained by referring to FIG. 5. FIG. 5 is a flow chart for explaining operation of the data diagnosis, wherein if the data diagnosis function is activated (or started) by the event controller means 15 described above, then the systematic diagrams of the overall system of the artificial satellite and the subsystem are displayed on the operation console unit (Step S101). The failure occurring part (or the abnormal part) is displayed as discriminated by color on the systematic diagram as described above in accordance with the result of the data diagnosis based on the diagnosis means 18 (Step S102). Then diagnosis of a failure is executed (Step S103). A countermeasure for the failure is prepared (Step S104). This countermeasure for the failure is also contained in the above-mentioned rules and such a countermeasure is automatically selected depending on the failure. Simulation at the time of executing this countermeasure is performed by using the simulation means 17 and the result is thereby assumed (Step S105). At the end of the procedure, command data for executing the countermeasure is prepared and transmitted to the artificial satellite (Step S106).

Since the software means incorporated in the operations control apparatus according to a prior art is constituted in the manner as above explained, at the time of normal processing by means of the event controller means 15, the respective processing will be executed only in accordance with the predetermined processing order, such that processing cannot be optimized depending on the situations in the manner of on-line processing by altering the processing order as desired. Accordingly, not only in operations control of a single artificial satellite but also in simultaneous operations control of a plurality of artificial satellites according to the normal processing method of a prior art, a specialist has to always watch the processing order and execute correction of the processing order depending on the failure, resulting in a more complicated processing operation and the expenditure of more time.

Furthermore, the diagnosis rules which are to be contained in the knowledge data base section 18a of the diagnosis means 18 must be revised for each use in diagnosis of operations control of an artificial satellite by a specialist in the field of artificial satellites, in accordance with the design values at the time of designing which are used as the reference values, and addition and modification for the diagnosis rule currently in use also have to be executed by a specialist, with the result that a tremendous amount of work and time by a number of specialists had to be expended during the period of operation of an artificial satellite.

SUMMARY OF THE INVENTION

The present invention has been proposed to eliminate the problems as described above. An object of the present invention is, therefore, to provide an operations control apparatus capable of contributing the labor saving and a rapid operation in the simultaneous operations control of a plurality of objects such as artificial satellites by making it possible to automatically prepare and correct diagnosis rules.

To achieve this object, an operations control apparatus according to the present invention including a data processing unit for processing data for operations control of an object, said data processing unit including an event controller means, a common data base means and a simulation means, and a data diagnosis unit connected to said processing unit, for diagnosing said data for operations control, said data diagnosis unit including a diagnosis means further comprises a management means for checking the processing order of the respective means in response to the state of said object which is varying with respect to time, to prepare the optimum processing order of the respective means, and for instructing the same to said event controller means; a failure mode and effect analysis sheet preparing and correcting means for predictively analyzing a failure mode and effect of said object, and for preparing and correcting a sheet representing the results of analysis; and a means for automatically preparing and correcting diagnosis rules in accordance with said sheet of the analysis results.

According to the present invention, the optimum processing order is always newly prepared depending on the state of an object which is varying with respect to time such as the state of an artificial satellite which is varying constantly and automatically instructed to the event controller means by the management means. Accordingly, it is not necessary to determine in advance the processing order, for example, such processing as determination of the orbit and attitude of an artificial satellite and control processing of orbit and attitude, but such processing can be executed as desired depending on the situation and also meet with simultaneous control of a plurality of objects such as artificial satellites, such that it may contribute to labor saving, automation, rapid operation and high efficiency in operations control. Furthermore, the failure mode and effect analysis sheet preparing and correcting means and the means for preparing and correcting diagnosis rules allow assumption and analysis of the failure and effect of objects such as artificial satellites based on the telemetry data obtained from the objects as well as automatic preparation and correction of the diagnosis rules, thus further contributing labor saving, automation and rapid operation in the operations control.

Further, according to the present invention, since the management means, the means for analyzing and correcting the failure mode and effect and the means for preparing and correcting the diagnosis rules are newly added to a prior art to enable intellectual processing work which was carried out manually such as scheduling work to now be mechanically processed, whereby labor saving, automation and rapid operation in the operations control are attainable.

Other aspects and advantages of the present invention will become apparent from reading the following detailed description when considered in conjunction with the accompanying drawings, in which like parts are designated by like reference numerals.

BRIEF DESCRIPTION OF THE DRAWINGS

FIG. 4 is a schematic table explaining the knowledge data base section of the diagnosis means according to a prior art;

DETAILED DESCRIPTION OF THE PREFERRED EMBODIMENTS

Figure 6:
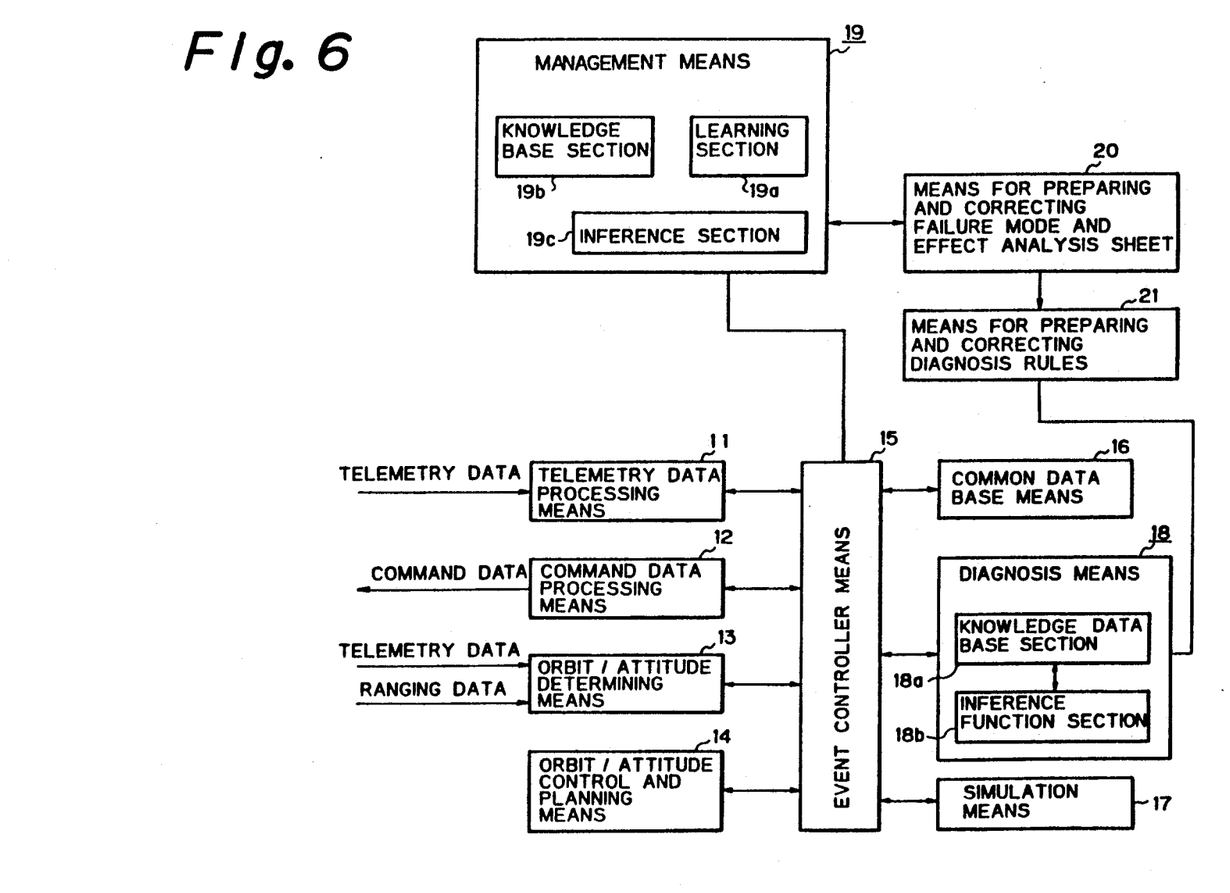
FIG. 6 is a diagram showing a construction of the software as illustrated in an embodiment of the present invention.

An embodiment of the present invention will now be explained by referring to the accompanying drawings. FIG. 6 illustrates the overall constitution of the respective means as the software for explaining the function of the data diagnosis unit 4 which has been improved by the present invention from the apparatus shown in FIG. 1. In FIG. 6, numerals 11-18 designate the identical means to those adopted in the conventional apparatus shown in FIG. 2. Numerals 19-21 designate those means which have been added by the present invention. More specifically, numeral 19 designates the management means which comprises a learning section 19a, a knowledge base section 19b and an inference section 19c and is connected to a conventional event controller means 15. Numeral 20 designates a means for preparing and correcting the failure mode and effect analysis sheet. Numeral 21 designates a means for preparing and correcting the diagnosis rules.

The above-described management means 19 has the following functions a, b and c which are respectively explained below.

a. Scheduling Function

This function is to execute the search of optional solution under various restrictive conditions based on the algorism which is applied in the expert system generally called by the plan type or scheduling type in the field of the artificial intelligence and knowledge engineering. An operational example of this function is found in such a case as the processing steps which were determined in advance prior to launching of an artificial satellite are required to be altered according to the actual orbit that the satellite has taken after launching, for example, when the actual orbit has deviated from the target orbit which was assumed previously, the processing steps for correcting the orbit are added so that the processing steps which were determined in advance could be altered as desired. In such a case, the optimal solution will be searched under restrictive conditions as to a combination of various processing steps and time allocation necessary for determining the orbit and attitude and executing the orbit and attitude control by use of this scheduling function, whereby a most optimum scheduling may be performed.

This scheduling function is not only useful for scheduling for the operations control of a single satellite but also contributing to labor saving, automation and time reduction of the scheduling work such as providing a most optimum combination of various processing steps and time allocation for the simultaneous operations control of a plurality of artificial satellites.

b. Learning Function

As shown in FIG. 6, the means 20 for preparing and correcting the analytical sheet of failure mode and effect, which is hereinbelow described, is connected to the management means 19 and the conventional respective means 11-18 are also, through the event controller means 15, connected to the management means 19. The results of the processing steps of these respective means 11-18 and 20 are all input to the management means 19. This learning function is to extract, classify and arrange the knowledge necessary for operations control of the satellite from these data input to the management means 19 and store them in the knowledge base section 19b.

c. Consultant Function

This function is adapted to intelligently search the knowledge base section 19b in response to the inquiries from operators responsible for the operations control or specialists and provide various information necessary for the operations control.

These three functions a, b and c can be exhibited through useful cooperation that takes place among the learning section 19a, the knowledge base section 19b and the inference section 19c, which together comprise the management means 19. Each of these functional sections will now be explained.

(a) Learning Section (19a)

This learning section 19a mainly serves to manage the acquisition of knowledge and the effect of learning, thus providing for intelligent processing by using the knowledge base section 19b and the inference section 19c.

The term "intelligent" as used herein is directed to mean "the provision of the ability to make certain inferences on the basis of the knowledge base and the inference function". The term "certain inferences" is used herein to mean a generally defined concept of inference in the field of knowledge engineering, such as deductive inference, inductive inference, analogy and the like.

Accordingly, the learning section 19a can search the optimal solution by using these inference functions and the knowledge base and automatically generate the knowledge necessary for operations control of an artificial satellite by heuristically learning from the knowledge acquired by using these inference functions and the knowledge base.

The term "heuristic learning" herein used is directed to mean as mentioned above learning by inductive inference. The knowledge acquired piece by piece may not only be accumulated in the knowledge base through the steps of classification, rearrangement and systematization and/or structural organization but may also serve to mutually supplement any deficiency in the knowledge base.

(b) Knowledge Base Section (19b)

It is the knowledge base section 19b which arranges, edits, stores and accumulates a variety of items of knowledge.

The term "knowledge" as used herein is directed to cover the following four types of knowledge, each of which will next be explained.

(I) Past Design, Manufacturing and Test Information and Operations Control Information This information covers all information that is expressed by numerals, graphics, picture images, or the like in regard to the design, manufacturing and test data of the artificial satellites which have been launched so far and operations control information including event sequences, results of scheduling, trouble information, check lists and the like in regard to the operations control that has been executed in the past.

(II) Current Information

The current information in regard to (I) which are being acquired in the course of present operations control.

(III) Information Acquired by Learning

Knowledge available for the purpose of operations control as obtained from the results of learning from the current information in (II) by use of an inference function.

(IV) Information on Design Models

This is directed to information representing the object of a design per se, which is also called "an object model" in the field of knowledge engineering as exemplified by the information which represents subject matter designed on the basis of a given essential design specification.

Such four types of knowledge as listed up above are accumulated in the knowledge base section 19b in a variety of fashions.

The wording "a variety of fashions" follows the knowledge rotation commonly used in the field of knowledge engineering, which is generally used to mean "Production system", "frame", "blackboard model", "semantic network", "predicate calculus", "object", etc.

(c) Inference Section (19c)

The inference section 19c comprises an individual mechanism which is independent from the learning section 19a and the knowledge base section 19b and this inference section may perform inference by making use of the knowledge accumulated in the knowledge base section 19b.

The term "inference" as used herein is directed to mean to concept of "function to derive information from given information where said derived information has the same or an implied meaning of said given information but has a different expression in at least an explicit fashion", and hence, the commonly used syllogism may be covered by this concept of inference.

However, this inference section 19c may cover, as noted above, such various inference functions as those defined generally as inductive inferences, analogy inferences, default inferences and the like.

As will be apparent from the foregoing explanation, the management means 19 which comprises the learning section 19a, the knowledge base section 19b and the inference section 19c is furnished with the scheduling function, the learning function and the consultant function and it is thus seen that the management means 19 is useful for labor saving and rapid operation in the intelligent processing for the purpose of operations control.

The means 20 for preparing and correcting failure mode and effect analysis sheet and the means 21 for preparing and correcting the diagnosis rules will next be explained in detail.

Generally, at the time of designing an artificial satellite, the various functions that the relative system or the sub-system have are grouped in each functional block as the result of design and it is a common practice that a functional block diagram which illustrates the relation of input/output between the respective blocks is prepared.

The means 20 for preparing and correcting the failure mode and effect analysis sheet is a software means (or program) which serves to perform a failure mode and effect analysis (abbreviated as FMEA) in accordance with the functional block diagram prepared at the time of design and to bring the results of its analysis into an FMEA sheet accordingly.

This FMEA is a procedure for analysis which is commonly practical at the design stage as one of the various system engineering-like analytic techniques available. In the present embodiment, the steps of processing conducted by the means 20 for preparing and correcting the failure mode and effect analysis sheet is duly constructed in accordance with this analytic technique (or FMEA method). FMEA sheet can be prepared through the interaction between the data diagnosis unit 4 and the designer (or the specialist) in the artificial satellite field. This interaction processing is directed to such a method whereby the specialist may key in an answer to an interrogative sentence displayed on the screen of the CRT, for example, a graphic display or the like of the data diagnosis unit.

The means 20 for preparing and correcting the failure mode and effect analysis sheet is comprised of an FMEA format preparation program and an interrogative sentence generation processing program. These programs will next be explained in detail.

(a) FMEA Format Preparation Program

Figure 7:
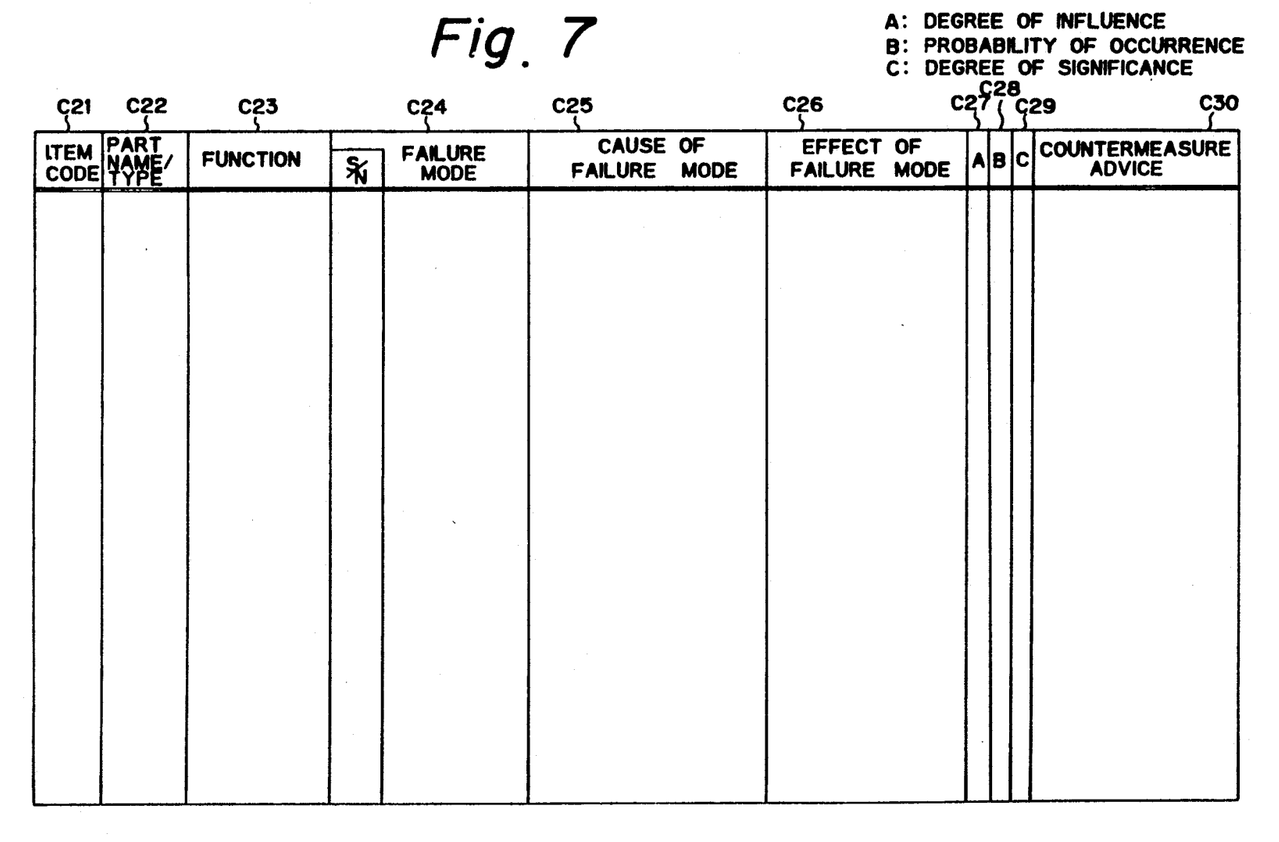
FIG. 7 is an illustrative chart showing an example of the format for FMEA sheet to be prepared by the means for preparing and correcting the analysis sheet of the failure mode and effect shown in FIG. 6.

This program is adapted to prepare the format (framing) of FMEA sheet according to FMEA procedure noted above and has a similar function to that of the flow of processing for a program that serves to prepare a general table framing. FIG. 7 illustrates an example of formatting of an FMEA sheet as prepared by the above-mentioned program. In this drawing, the respective columns C21–C30 are named after the content to be described as the result of interaction processing. These columns follow the style of division generally employed in the FMEA procedure noted above.

(b) Query Generation Processing Program

Figure 8:
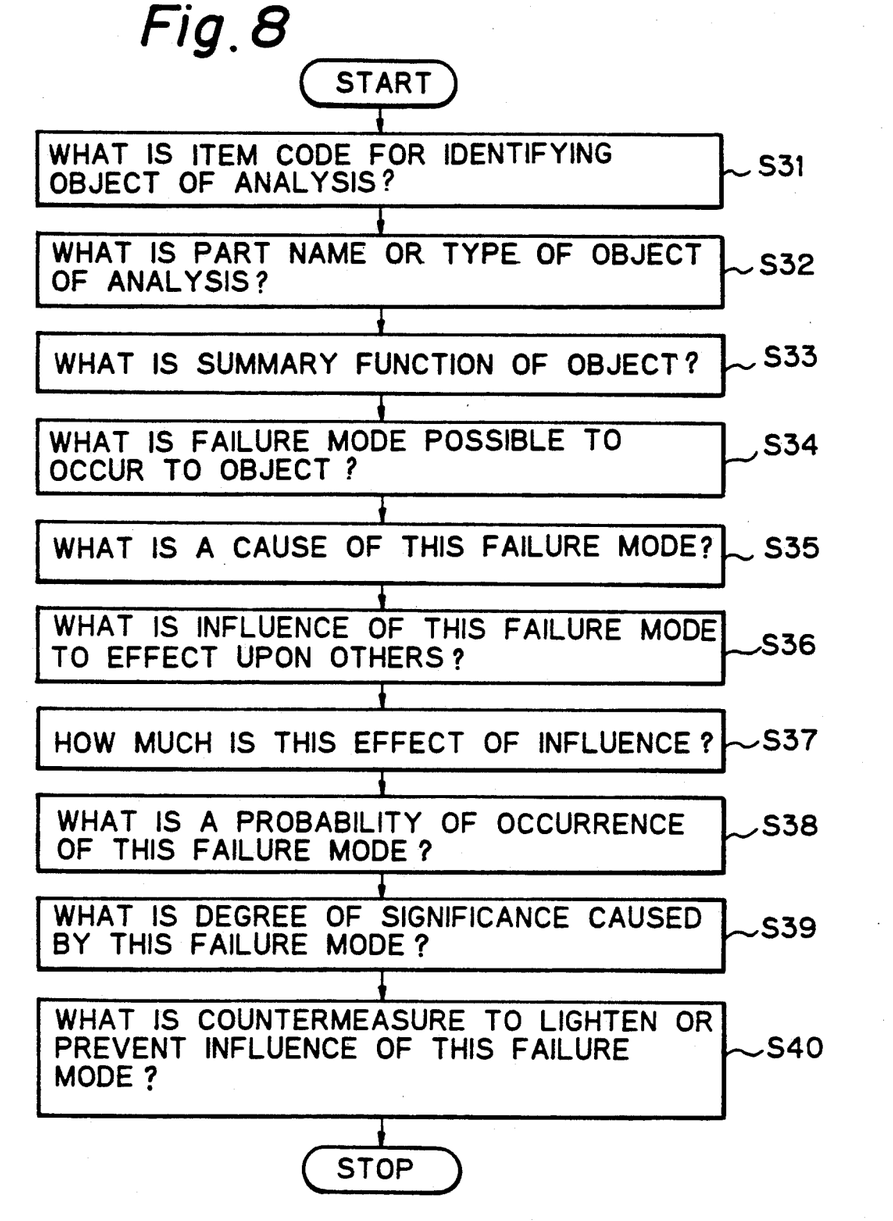
FIG. 8 is a flow chart showing the operation of the means for preparing and correcting the analysis sheet of the failure mode and effect shown in FIG. 7.

This program serves to perform such processings as generating an interrogative sentence for aiding a specialist to fill blank columns of an FMEA sheet prepared by the FMEA format preparation program with concrete contents and display such interrogative sentence on the screen of CRT. Then the program fetches the answer given by a specialist to such an interrogative sentence and then fills each column in the FMEA sheet. Such a processing operation is similar in function to those undertaken in a general interactive processing program. Concrete examples of interrogative sentences which are generated in sequence during processing of this program are shown in FIG. 8 in the form of the flow chart so as to explain the processing operation of this program in further detail. When a specialist inputs his answer in response to the respective interrogative steps S31 through S40 in sequence shown in this drawing using the key board of the data diagnosis unit 4, this program serves to fill the columns of FMEA sheet with the input answers to complete the FMEA sheet.

By virtue of use of the means 20 for preparing and correcting the failure mode and effect analysis sheet which comprises the two types of programs (a) and (b) as stated above, the FMEA sheet may be prepared based on the FMEA technique as described above by way of interactive processing between the data diagnosis unit 4 and a specialist.

The means 21 for preparing and correcting the diagnosis rules is a software means adapted to prepare a test data diagnosis reference rule (diagnosis rule) to be described later from the contents of the FMEA sheet prepared by the means 20 for preparing and correcting the failure mode and effect analysis sheet as described above. This diagnosis rule is an aggregate of the rules which are stored in the knowledge data base section 18a of the diagnosis means 18 described above.

As an explanation of the processing operation of this means 21 for preparing and correcting the diagnosis rule, a concrete example is given below of a processing procedure for preparing a diagnosis rule to be used for diagnosis of the test data on a gas jet apparatus (gas jet subsystem) from the contents of the FMEA sheet on this gas jet apparatus which is adapted to control the orbit and attitude of an artificial satellite, by using the above-mentioned means 21 for preparing the diagnosis rules.

Figure 9:
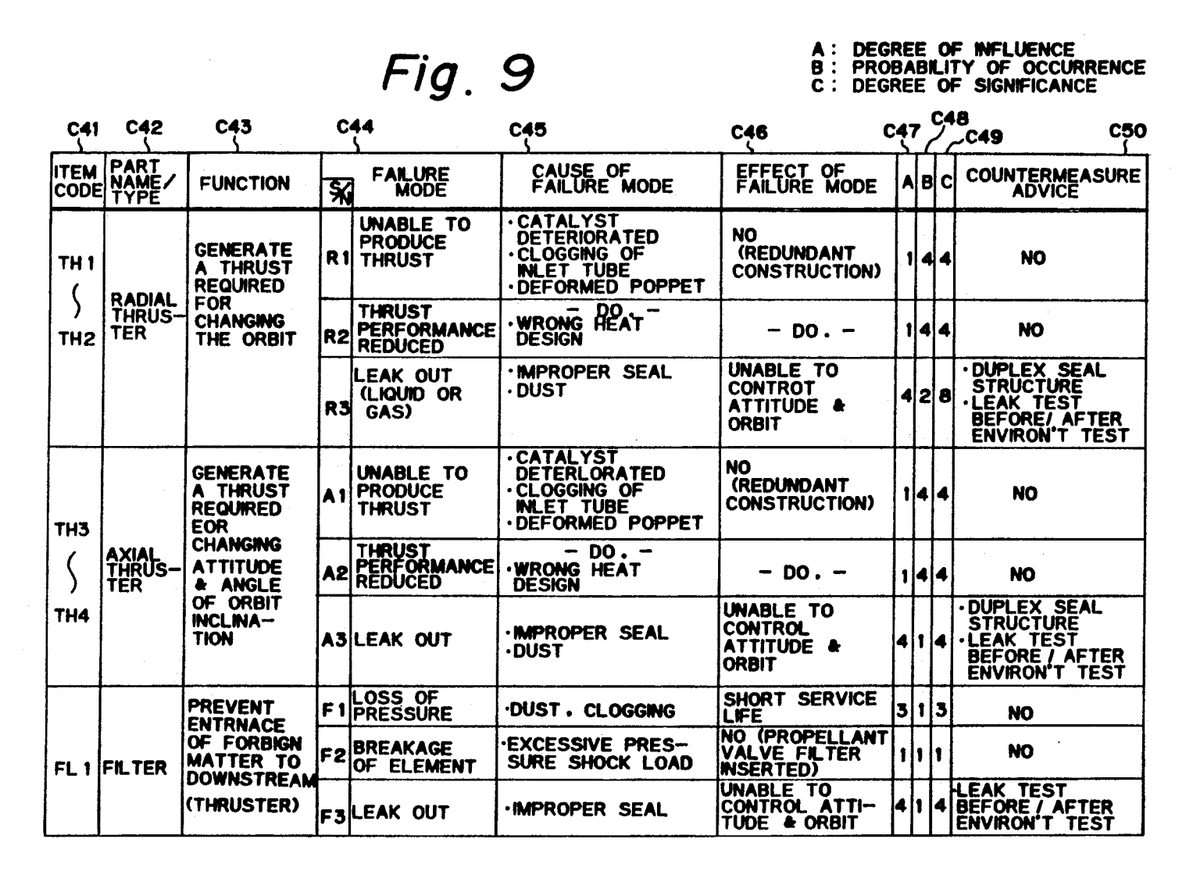
FIG. 9 is a table explaining the relationship between the diagnosis rule prepared by the means for preparing and correcting the diagnosis rules shown in FIG. 6 and the FMEA sheet.

FIG. 9 is an example of the FMEA sheet prepared in connection with the gas jet apparatus noted above. In the drawing, the content described in the failure mode C44 corresponds to the assumption part of the diagnosis rule to be later described, while the contents described in the failure mode cause column C45, the failure mode effect column C46 and the recommended countermeasure column C50 correspond to the conclusion part of the diagnosis rule. For example, if there is a statement "liquid and gas leak" in the description in the failure mode column C44 for a radial thruster in FIG. 9, then the following rule of diagnosis may be adopted.

(Assumption Part): If there is leak of the liquid or the gas from the radial thruster.

(Conclusion Part): Cause is an improper seal or clogging with dust, which would lead to incapacitated attitude/orbit control. As countermeasures, it is necessary to use a duplex sealing structure and conduct a leakage test before and after an environment test.

As will be apparent from this concrete example of a diagnosis rule as explained above, the assumption part and the conclusion part of the diagnosis rule correspond to the contents of the columns in the FMEA sheet, and so the content of these assumption and conclusion parts may be determined according to that correspondence whereby the diagnosis rule may be prepared automatically.

Figure 10:
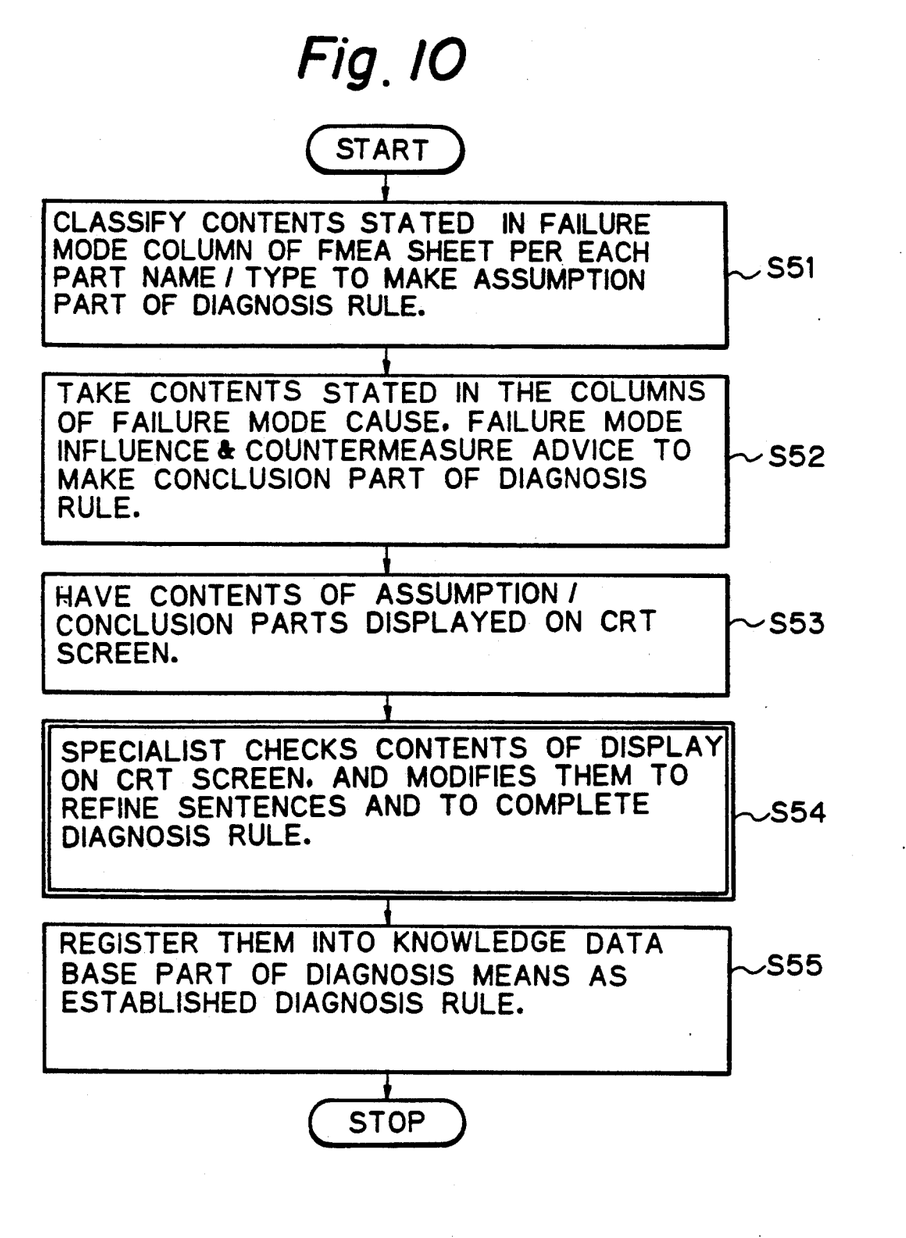
FIG. 10 is a flow chart explaining the operation of the means for preparing and correcting the diagnosis rules.

FIG. 10 is the flow chart showing a flow of processing steps for explaining the operation of the means 21 for preparing and correcting the diagnosis rule noted above. In this chart, while the processing steps S51, S52, S53 and S54 may be automatically performed by the above-mentioned means 21 for preparing and correcting the diagnosis rule, the step S54 includes a procedure whereby the content of the diagnosis rule automatically prepared in the above-mentioned steps S51 through S53 is subjected to check and, if necessary, corrected by a specialist. In this way, the diagnosis rule which has been finally checked and corrected will be registered in the knowledge data base section 19b of the management means 19 and efficiently used for the purpose of diagnosis of test data.

As is clear from the foregoing explanation, the design data at the time of design may be usefully employed for diagnosis of the data for operations control by means of the means 20 for preparing and correcting the failure mode and effect analysis sheet and the means 21 for preparing and correcting the diagnosis rules.

Although the means 19-21 have all been explained as software in the above-described embodiment, they can be hardware or firmware or a mixture, so long as a similar function and performance may be attained. As an example of such hardware or firmware, there are available neuro chips in which the neural network is implemented on a semiconductor substrate, fuzzy chips adopted to process the fuzzy set theory, and the like.

The above-mentioned means 19-21 may be constituted in the form of mixture of such hardware and firmware containing such chips as described above.

Furthermore, although an inference machine has been employed as the data diagnosis unit 4 in the embodiment described above, the type of the computer (or machine) is not particularly restricted so long as the processing means 18-21 can be processed. The number of the computers to be employed is also not limited to one but rather a plurality of computers may be employed to share processing of the above-mentioned means 18-21, depending on the extent of processing. Conversely, the above-mentioned data processing unit 3 and the data diagnosis unit 4 may be integrated and constituted by a single computer.

Furthermore, in the above-described embodiment, although a similar unit to the conventional one is employed as the operation console unit and the man-machine-interface comprising CRT and a key board is adopted, the interface is not limited to that type but other type of interface such as a voice interaction device having the voice recognition and synthesis function may be incorporated in the operation console unit.

Furthermore, although the present invention has been explained in connection with the operations control apparatus for an artificial satellite, it is needless to explain that the present invention is not limited to application for an artificial satellite but can be applied to aircraft, ships, vehicles and the like and also to such general operations control apparatus as require operations control.

What is claimed is:

1. An operations control apparatus including a data processing unit for processing data for operations control of an object, said data processing unit including an event controller means, a common data base means and a simulation means, and a data diagnosis unit connected to said processing unit, for diagnosing said data for operations control, said data diagnosis unit including a diagnosis means, said operations control apparatus further comprising:

a management means for checking the processing order of the respective means in response to the state of said object which is varying with respect to time, to prepare the optimum processing order of the respective means, and for instructing the same to said event controller means;

a failure mode and effect analysis sheet preparing and correcting means for predictively analyzing a failure mode and effect of said object, and for preparing and correcting a sheet representing the results of analysis; and a means for preparing and correcting diagnosis rules in accordance with said sheet of the analysis results.

2. An operations control apparatus as claimed in claim 1, wherein said object is an artificial satellite.

3. An operations control apparatus as claimed in claim 1, wherein said management means includes:

means defining a learning section for acquiring and learning knowledge for operations control from the data which are output to said management means from said event controller means, said common data base means, said simulation means, said diagnosis means and said failure mode and effect analysis sheet preparing and correcting means, respectively;

means defining a knowledge base section for accumulating the knowledge relating to said object and knowledge for operations control generated by said learning section; and means defining an inference section for performing inferences using the knowledge accumulated in said knowledge base section.

4. An operations control apparatus as claimed in claim 3, wherein said knowledge contained in said knowledge base section comprises past design and operations control information, newly acquired operations control information, information acquired by learning, and information on design models.

5. An operations control apparatus as claimed in claim 1, further comprising an operation console unit connected both to said data processing unit and said diagnosis unit, which serves as an interface between an operator and said data processing unit and said diagnosis unit.

* * * * *